(12) United States Patent
Gonzalez et al.

(10) Patent No.: US 6,360,858 B2
(45) Date of Patent: Mar. 26, 2002

(54) DAMPING APPARATUS FOR BICYCLE FORKS

(75) Inventors: Jose Gonzalez, Canyon Country; Thomas Jesse Rogers, III, Saugus, both of CA (US)

(73) Assignee: Answer Products, Inc., Valencia, CA (US)

( * ) Notice: Subject to any disclaimer, the term of this patent is extended or adjusted under 35 U.S.C. 154(b) by 0 days.

(21) Appl. No.: 09/776,485

(22) Filed: Feb. 2, 2001

Related U.S. Application Data

(63) Continuation of application No. 09/081,157, filed on May 18, 1998, now Pat. No. 6,241,060, and a continuation of application No. 08/725,409, filed on Oct. 3, 1996, now Pat. No. 5,848,675.

(51) Int. Cl.$^7$ ................................................ B62K 25/08
(52) U.S. Cl. ................................ 188/319.2; 188/319.1; 280/276
(58) Field of Search ............................... 188/284, 285, 188/310, 312, 313, 315, 318, 319.1–319.2, 322.15, 322.22; 280/276, 283

(56) References Cited

U.S. PATENT DOCUMENTS

| | | |
|---|---|---|
| 51,368 A | 12/1865 | Vose |
| 783,236 A | 2/1905 | Ashburn |
| 2,477,748 A | 8/1949 | Hutchins |
| 2,560,627 A | 7/1951 | Boschi |
| 2,683,034 A | 7/1954 | Seddon |
| 2,683,044 A | 7/1954 | Seddon |
| 2,708,112 A | 5/1955 | Seddon et al. |
| 2,743,102 A | 4/1956 | Seddon et al. |
| 2,756,070 A | 7/1956 | Torre |
| 3,083,038 A | 3/1963 | Moulton |
| 3,256,950 A | 6/1966 | Casimir |
| 3,312,312 A | 4/1967 | Bourcier de Carbon |
| 3,380,557 A | 4/1968 | Peterson |
| 3,606,295 A | 9/1971 | Appleton |
| 3,827,538 A | 8/1974 | Morgan |

(List continued on next page.)

FOREIGN PATENT DOCUMENTS

| | | |
|---|---|---|
| DE | 2 230 975 | 12/1972 |
| DE | 35 03 152 A1 | 8/1986 |
| EP | 0 172 708 A2 | 2/1986 |
| EP | 0 420 610 A1 | 4/1991 |
| EP | 0 834 448 A2 | 4/1998 |
| FR | 2206723 | 6/1974 |
| FR | 2460797 | 1/1981 |
| GB | 264 003 | 1/1927 |
| GB | 469 697 | 7/1937 |
| GB | 529 305 | 11/1940 |

(List continued on next page.)

OTHER PUBLICATIONS

*Answer Mountainbike Accessory Catalog*, 1996.
Answer Products; Date Unknown; "Championship Technology You Can Afford," ProForx ST and ProForx LT.
*Bicycling*, Apr. 1991; vol. 3; No. 3; No. 3; p. 84; John Kukoda,; "Sproing! The Shocking truth about those new suspension bikes; evaluation."
*Bicycling*, Nov. 1992; vol. 33; No. 9; p. 74.
*Bicycling*, Apr. 1993; vol. 34; No. 4, p. 79; Geoff Drake, Scott Martin & Jim Langley; "Going Boing in Baja; Montain Bikes."

(List continued on next page.)

*Primary Examiner*—Christopher P. Schwartz
(74) *Attorney, Agent, or Firm*—Barnes & Thornburg

(57) ABSTRACT

A bicycle fork having a damping apparatus that includes a cylinder, a damping fluid and a piston. The cylinder defines a chamber. The damping fluid is located in the chamber. The piston is disposed in the chamber and is positioned adjacent the fluid.

7 Claims, 12 Drawing Sheets

U.S. PATENT DOCUMENTS

| | | |
|---|---|---|
| 3,837,445 A | 9/1974 | Pierle |
| 3,936,076 A | 2/1976 | Probst |
| 4,037,855 A | 7/1977 | Smith |
| 4,145,067 A | 3/1979 | Ceriani |
| 4,260,170 A | 4/1981 | Terai et al. |
| 4,278,266 A | 7/1981 | Inoue et al. |
| 4,352,487 A | 10/1982 | Shtarkman |
| 4,401,298 A | 8/1983 | Eaton et al. |
| 4,421,337 A | 12/1983 | Pratt |
| 4,464,986 A | 8/1984 | Bollani |
| 4,558,878 A | 12/1985 | Montrenec |
| 4,561,669 A | 12/1985 | Simons |
| 4,566,712 A | 1/1986 | Montrenec |
| 4,570,963 A | 2/1986 | Isono |
| 4,756,512 A | 7/1988 | Toms, Jr. |
| 4,757,884 A | 7/1988 | Fannin et al. |
| 4,795,009 A | 1/1989 | Tanahashi et al. |
| 4,802,561 A | 2/1989 | Knecht et al. |
| 4,815,763 A | 3/1989 | Hartmann |
| 4,834,222 A | 5/1989 | Kato et al. |
| 4,834,223 A | 5/1989 | Kawamura et al. |
| 4,961,482 A | 10/1990 | Pohlenz et al. |
| 4,964,625 A | 10/1990 | Kawamura |
| 4,971,344 A | 11/1990 | Turner |
| 5,042,625 A | 8/1991 | Maus |
| 5,044,648 A | 9/1991 | Knapp |
| 5,060,961 A | 10/1991 | Bontrager |
| 5,088,705 A | 2/1992 | Tsai |
| 5,092,421 A | 3/1992 | Tsurumaki et al. |
| 5,098,120 A | 3/1992 | Hayashi et al. |
| 5,158,161 A | 10/1992 | Yamaoka et al. |
| 5,184,703 A | 2/1993 | Van Zeggeren |
| 5,186,481 A | 2/1993 | Turner |
| 5,193,832 A | 3/1993 | Wilson et al. |
| 5,193,833 A | 3/1993 | Reisinger |
| 5,195,766 A * | 3/1993 | Dohrmann et al. ......... 280/276 |
| 5,238,259 A | 8/1993 | Wilson et al. |
| 5,246,092 A | 9/1993 | Yamaoka |
| 5,248,159 A | 9/1993 | Moore |
| 5,269,549 A | 12/1993 | Wilson et al. |
| 5,275,264 A | 1/1994 | Isella |
| 5,277,283 A | 1/1994 | Yamaoka et al. |
| 5,284,352 A | 2/1994 | Chen |
| 5,301,973 A | 4/1994 | Truchinski |
| 5,308,099 A | 5/1994 | Browning |
| 5,310,203 A | 5/1994 | Chen |
| 5,320,374 A | 6/1994 | Farris et al. |
| 5,350,185 A | 9/1994 | Robinson |
| 5,380,026 A | 1/1995 | Robinson |
| 5,382,037 A | 1/1995 | Chang et al. |
| 5,398,954 A | 3/1995 | Chonan |
| 5,405,159 A | 4/1995 | Klein et al. |
| 5,417,446 A | 5/1995 | Pileggi |
| 5,445,401 A | 8/1995 | Bradbury |
| 5,456,480 A | 10/1995 | Turner et al. |
| 5,460,357 A | 10/1995 | Stewart |
| 5,470,090 A | 11/1995 | Stewart et al. |
| 5,494,302 A | 2/1996 | Farris et al. |
| D368,054 S | 3/1996 | Behrens et al. |
| 5,499,189 A | 3/1996 | Seitz |
| D368,681 S | 4/1996 | Behrens et al. |
| 5,509,675 A | 4/1996 | Barnett |
| 5,509,677 A | 4/1996 | Bradbury |
| 5,533,597 A | 7/1996 | Nezu et al. |
| RE35,401 E | 12/1996 | Wilson et al. |
| 5,580,075 A * | 12/1996 | Turner et al. ............... 280/276 |
| 5,597,169 A | 1/1997 | Bradbury |
| 4,057,264 A | 11/1997 | Suzuki et al. |
| 5,848,675 A * | 12/1998 | Gonzalez ................. 188/319.2 |
| 5,934,697 A * | 8/1999 | McAndrews ............... 280/276 |
| 6,026,939 A * | 2/2000 | Girvin et al. ............ 188/266.7 |
| 6,042,091 A * | 3/2000 | Marzocchi et al. ...... 267/64.15 |
| 6,105,987 A * | 8/2000 | Turner ........................ 280/276 |
| 6,120,049 A * | 9/2000 | Gonzalez et al. ........... 280/276 |

FOREIGN PATENT DOCUMENTS

| | | |
|---|---|---|
| GB | 585 122 | 1/1947 |
| GB | 2 026 635 | 2/1980 |
| GB | 1 588 267 | 4/1981 |
| GB | 2 088 994 A | 6/1982 |
| GB | 2 265 435 A | 9/1993 |
| JP | 62-3389 | 6/1985 |
| SE | 147 555 | 11/1954 |
| TW | 238646 | 1/1995 |
| TW | 282762 | 1/1996 |

OTHER PUBLICATIONS

*Bicycling*, Aug. 1993, pp. 88–92; "Shocking News, A Buyer's Guide to Choosing and Installing a Front Suspension Fork."

*Bicycling*, Date Unknown; pp. 98 and 102; "Technical Q&A."

Bicyle Technologies International Ltd., Fall 1994, 3 pages.

*Cycling Science*, Fall 1992; pp. 6–12; "Bicycle Suspension Systems Meet Mr. Simple Dynamics."

European Search Report, completed Aug. 28, 1998, mailed Sep. 24, 1998.

*Guide to Suspension*, Date Unknown; Suspension Speak: Sprechen sie suspension? No? Think of this as a sort of Berlitz–Krieg guide to the language of suspension!.

*Guide to Suspension*, Date Unkown; Active Suspension: Running down the list of compontents and systems are dedicated to the purpose of shock absorption!.

*Guide to Suspension*, vol. 3; 1992; Various articles and advertisements, pp. 13–119.

*Judy Cartridge System Owner's Manual*, 1995.

*Judy Cartridge System Service Manual*, 1995.

*Judy Cartridge System Owner's Manual*, Date Unknown.

*Judy Cartridge System, Judy DHO Owner's Manual*, Date Unknown.

*Judy Cartridge System; Judy Owner's Manual*, 1997.

*Mountainbike Accessory Catalogue*, 1995.

*Mountain Bike Action*, Mar. 1993; Rock Shox Rocks the Boat.

*Mountain Bike Action*, Jan. 1994, front page.

*Mountain & City Biking*, Date Unknown, p. 59; Slingshot: Who says suspension is all new? These guys have been refining theirs since 1980.

*NW6a Owners Manual*, Jan. 23, 1986.

*Part Drawing*, Date Unknown.

*Popular Science*, May 1993; vol. 242; No. 5; p. 84; Marcelle M. Soviero, Kevin Cameron; Easy Riders: A New Breed of Mountain Bikes with High–Tech Suspensions . . .

*Rock Shox*, Date Unknown; Advertisement for "The New Stuff."

*Rock Shox Small Parts Catalog*, 1994.

*Rock Shox*, 1996; Advertisement for "Garden Variety 1996."

*Rock Shox*, Dates Unknown, Various advertisements for "Judy Cartridge System" and Judy Accessories.

*Rock Shox Mag*, Feb.; John Kukoda; Suspension of the Month: Rock Shox Mag 21.

*Rock Shox Small Parts Catalog*, 1995.

*Rock Shox, Judy Cartridge System Service Manual*, 1996.

*Rock Shox Small Parts Catalog*, 1996.

*Rock Shox Product Info.*, 1996.

*Rock Shox Productline*, 1997.
*Rock Shox Small Parts Catalog*, 1997.
*Rock Shox USA, The new world of RockShox*, 1997.
*Rock Shox Flash Cards*, 1995.
*Rock Shox, Frisky, A Scratching Post for Your Mind*, Issue #1, vol. 1, 1996; various ads and articles.
*Rock Shox Catalog*, 1996.

* cited by examiner

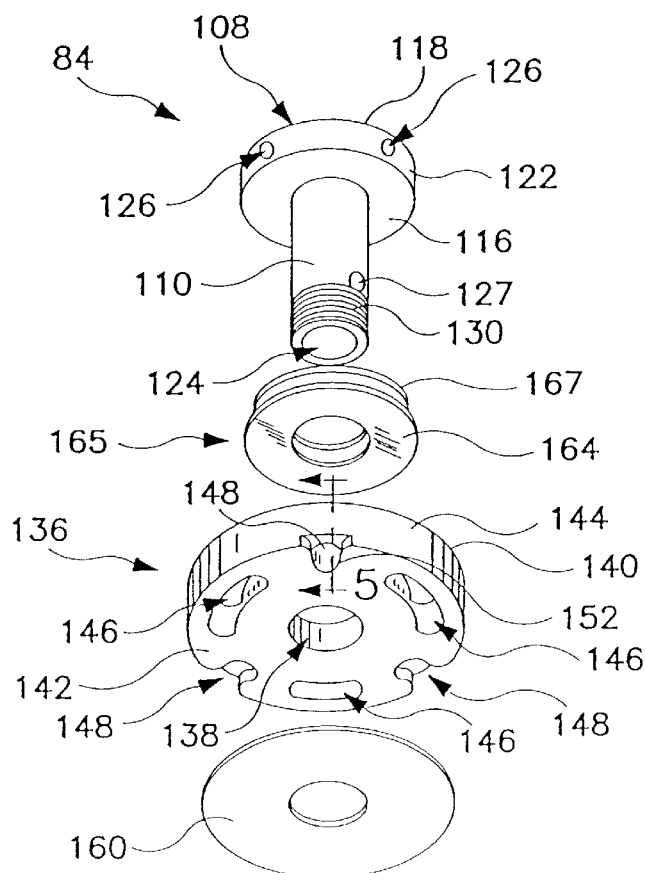
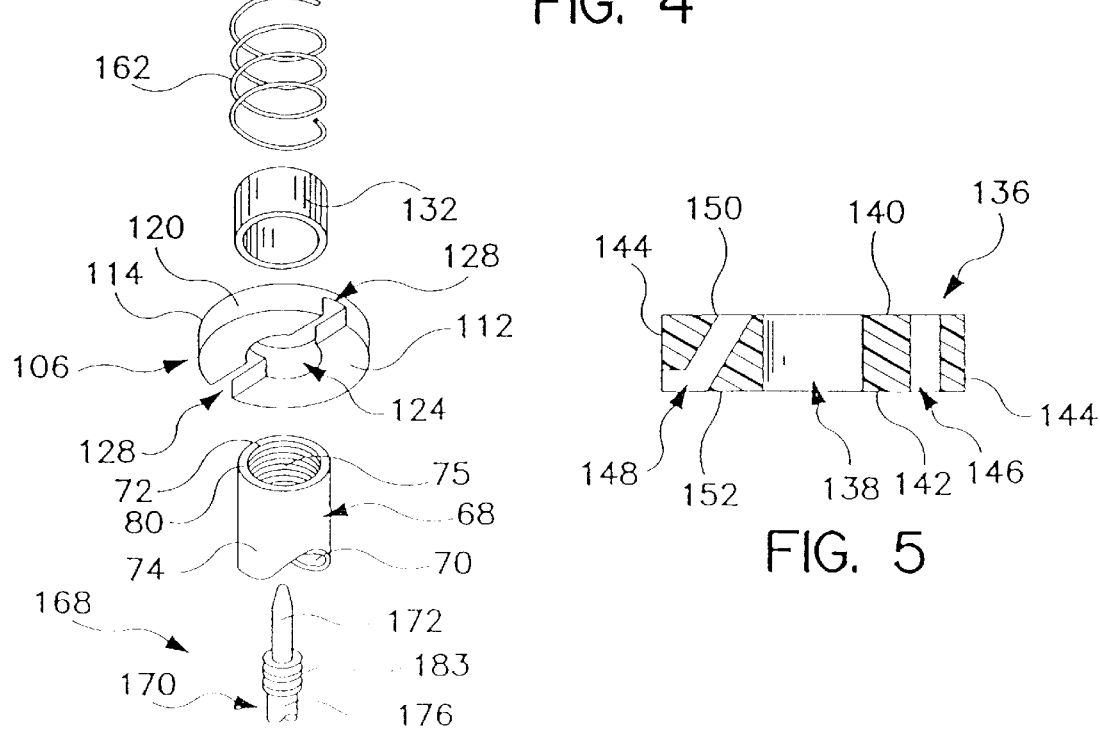
FIG. 4
FIG. 5

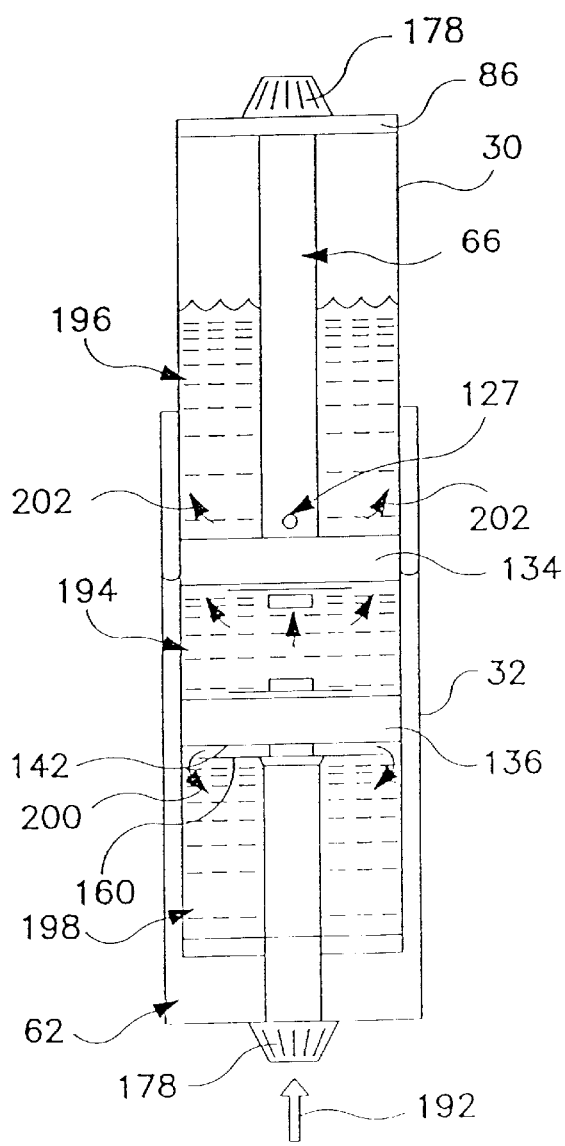
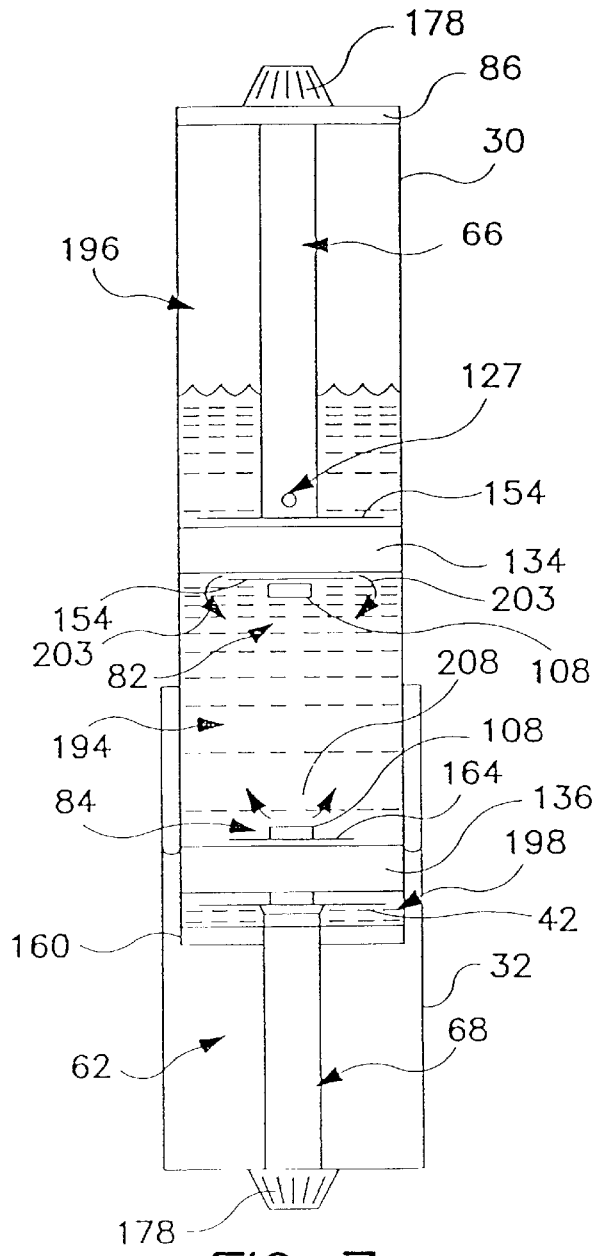
FIG. 6
FIG. 7

DAMPING APPARATUS FOR BICYCLE FORKS

RELATED APPLICATION

This application is a continuation of Ser. No. 08/725,406, filed Oct. 3, 1996, now U.S. Pat. No. 5,848,675 and a continuation of U.S. patent application Ser. No. 09/081,157, filed May 18, 1998, now U.S. Pat. No. 6,241,060 entitled DAMPING APPARATUS FOR BICYCLE FORKS, the complete disclosure of which is hereby expressly incorporated by reference.

TECHNICAL FIELD

The present invention is directed to a damping apparatus for use with bicycle forks, the apparatus of the type that provides fluid damping.

BACKGROUND AND SUMMARY

Conventional bicycle forks connect a front wheel of a bicycle to a bicycle frame so that the rider can rotate the front wheel and steer the bicycle. The bicycle fork typically includes a fork steerer tube that is easily rotated by handlebars. The steerer tube is coupled to a fork crown that extends across the top of the bicycle wheel. Two blades extend from opposing ends of the fork crown on opposite sides of the wheel to securely attach the crown to opposite sides of an axle of the front bicycle wheel.

Bicycle forks are not only used to steer bicycles, but they are also used to absorb various loads that are experienced by a front wheel of the bicycles. See, for example U.S. Pat. No. 5,445,401 to Bradbury. These conventional bicycle forks are known to include inner and outer telescoping members that are compressible toward one another and expandable away from one another to absorb shock.

In rough terrain, however, these telescoping bicycle forks often rebound too rapidly after hitting a large bump. Some bicycle riders have also found that traditional telescoping bicycle forks compress too rapidly upon hitting small bumps. Therefore, manufacturers of bicycle forks have developed damping apparatuses that have damping mechanisms for controlling the relative movement between the telescoping members. See, for example U.S. Pat. No. 5,445,401. Although bicycle riders have embraced damping bicycle forks, as riders maneuver their bicycles over rougher terrain for longer lengths of time heat build-up within the damping fluid can cause some traditional forks to "seize" due to pressure buildup in a closed system. This undesirable result has led some riders to use a damping apparatus that allows the damping oil to freely circulate between the two telescoping legs. Such an apparatus, however adds unnecessary weight to the bicycle and is difficult to dissemble. It would be beneficial to provide a damping apparatus that is incorporated into a bicycle fork that provides individual compression damping and rebound damping.

Accordingly, one illustrative embodiment provides a bicycle fork having a damping apparatus. The damping apparatus comprises a cylinder, a shaft, damping fluid, and a piston. The cylinder defines a chamber within which the shaft is disposed. The damping fluid is located in the chamber. The piston is also disposed in the chamber and is coupled with the shaft. The piston is movable relative to the shaft between first and second positions. The piston also has a fluid flow aperture disposed there through and a valve structure associated with the piston. The valve structure is movable between engaged and disengaged positions. The fluid flow aperture is occluded when the valve structure is engaged and is exposed when the valve structure is disengaged. The piston is movable from the first position to the second position as a result of an external force being applied to the fluid which acts on the piston. When the piston is in the second position, the fluid is caused to move through the fluid flow aperture and move the valve structure to the disengaged position. Further illustrative embodiments comprise a bias member associated with the piston, the shaft including first and second apertures in communication with each other with each aperture positioned on opposed sides of the piston. The first aperture is occluded when the piston is in the first positioned and is exposed when the piston is in the second position.

Another illustrative embodiment of the bicycle fork provides a damping apparatus comprising a cylinder a damping fluid and a floating piston. The cylinder defines a chamber. The damping fluid is located in the chamber. The floating piston disposed in the chamber and is positioned adjacent the fluid.

Additional features and advantages of the apparatus will become apparent to those skilled in the art upon consideration of the following detailed descriptions exemplifying the best mode of carrying out the apparatus as presently perceived.

BRIEF DESCRIPTION OF THE DRAWINGS

The illustrative apparatus will be described hereinafter with reference to the attached drawings, which are given as non-limiting, examples only, in which:

FIG. 4 is an enlarged exploded perspective view of a portion of the rebound piston unit showing a coupler, a shim stack, a rebound piston, a movable valve, a shaft, and a needle formed to extend into the coupler;

FIG. 5 is a cross-sectional view of the rebound piston taken along line 5—5 of FIG. 4;

FIG. 6 is a diagrammatic illustration of the damping apparatus showing compression of the upper leg into the lower leg;

FIG. 7 is a diagrammatic illustration of the damping apparatus showing the upper leg as it moves out from the lower leg to an extended position;

Corresponding reference characters indicate corresponding parts throughout the several views. The exemplification set out herein illustrates several embodiments of the apparatus and such exemplification is not to be construed as limiting the scope of the apparatus in any manner.

DETAILED DESCRIPTION OF THE DRAWINGS

Figure 1:
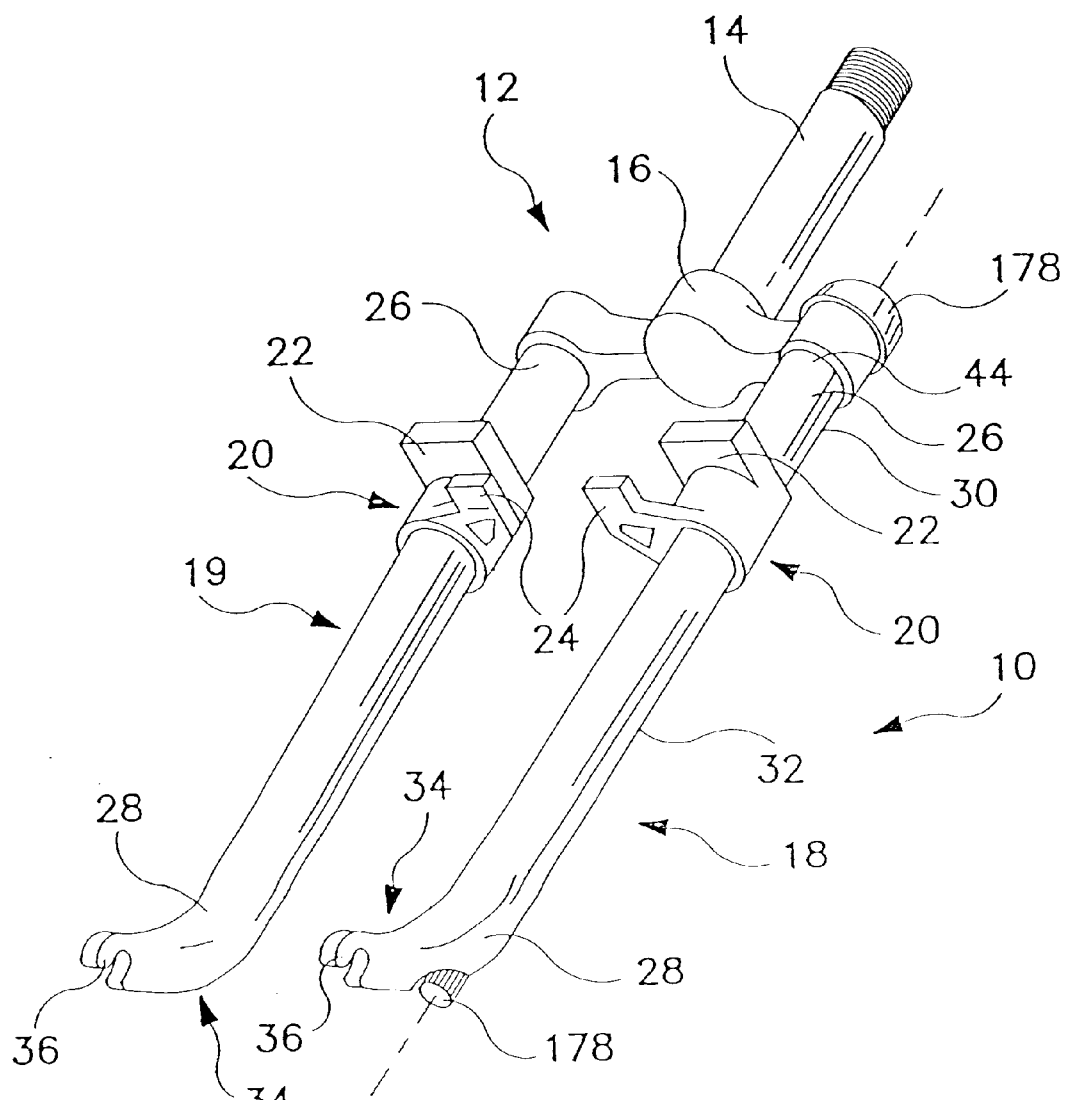
FIG. 1 is a perspective view of a bicycle fork that includes the damping apparatus of the present invention.

A damping apparatus 10 is formed for use in a suspension bicycle fork 12 mounted between a bicycle frame (not shown) and a front wheel axle (not shown). The bicycle fork 12 includes a steerer tube 14, a crown 16, two parallel fork legs 18, 19 and two brake flanges 20. Each brake flange 20 has a brake arch receiver 22 at one end for mounting a brake arch (not shown) thereon and a rim brake post receiver 24 at the other end for mounting a brake post (not shown). Each fork leg 18, 19 has an upper end 26 and a lower end 28. The upper ends 26 of the fork legs 18, 19 are connected to the crown 16 and the lower ends 28 of each of the fork legs 18, 19 form a dropout 34 that has a wheel axle catch portion 36 thereon. The damping apparatus 10 of the present invention is formed for use with one of the fork legs 18, 20 and includes an upper leg 30 and a lower leg 32 that slide relative to one another. The damping apparatus 10 also includes a compression piston unit 368 coupled to the upper leg 30, a rebound piston unit 40 coupled to the both the upper and lower legs 30, 32, and an oil bed cartridge 42 engaging the compression and rebound piston unit 38, 40. See FIG. 2. The oil is free to flow in the lower leg between the inner and outer ends 46, 44.

The upper leg 32 of the damping apparatus 10 is preferably the upper end 26 of the fork leg 18. The upper leg 30 has an outer end 44 coupled to the crown 16, an opposite inner end 46, and a center portion 48 being formed to define a cavity 50 between the opposite ends 44, 46. Illustratively, the center portion 48 of the upper leg 30 includes an interior face 52 having threads 54 formed at both the outer and inner ends 44, 46. The lower leg 32 of the damping apparatus 10 is preferably the lower end 28 of the fork leg 18. See FIG. 1. The lower leg 32 has a top end 56, an opposite bottom end 58, and a generally cylindrical side wall 60 defining a chamber 62 between the top and bottom ends 56, 58. The top end 56 of the lower leg 32 forms a rim 64 having a diameter sized to receive the inner end 46 and the center portion 48 of the upper leg 30 therethrough. See FIG. 2. The outer diameter of the upper leg 30 fits the inner diameter of the lower leg 32 so that the upper leg 30 is slidably engaged with the lower leg 32.

Figure 2:
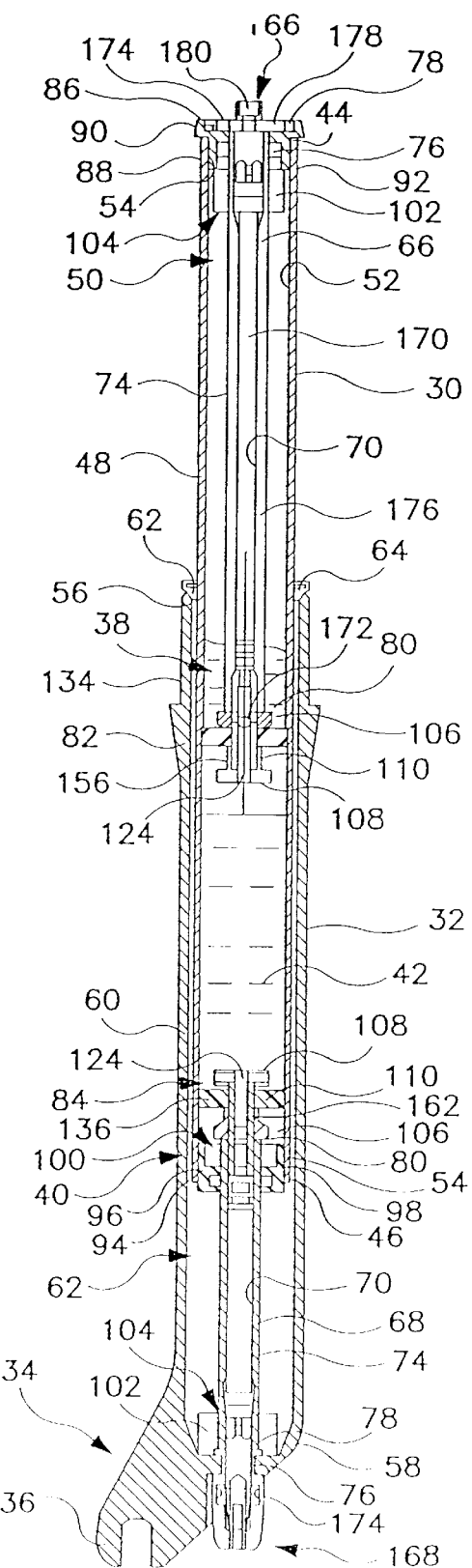
FIG. 2 is a cross-sectional view of the damping apparatus showing the damping apparatus having an upper leg formed for slidable extension into a lower leg, compression piston unit mounted in the upper leg, a rebound piston unit mounted on the lower leg and extending into the upper leg, and an oil bath situated in the upper leg between the compression and rebound piston units.

The ability of the upper leg 30 to slide into the lower leg 32 is affected by the compression piston unit 38. In contrast, the ability of the upper leg 30 to slide out of the lower leg 32 is affected by the rebound piston unit 40. The compression piston unit 38 includes a compression shaft 66 and the rebound piston unit 40 includes a rebound shaft 68. The shafts 66, 68 each have opposite ends 78, 80, an internal face 70 defining a passage 72, and an external face 74. Threads 75 extend about the internal face 70 at the second end 80 and threads 76 extend about the external face 74 at the first end 78. See FIGS. 2 and 3. As shown in FIG. 2, the shaft 66 of the compression piston unit 38 has a length suitable to position its second end 80 within the cavity 50 of the upper leg 30. In addition, the compression piston unit 38 includes a compression coupler 82 coupled to the second end 80 of the shaft 66. The shaft 68 of the rebound piston unit 40 has a length that is less than the length of the compression shaft 66, but sufficient to position its second end 80 within the cavity 50. The rebound piston unit 40 includes a rebound coupler 84 coupled to the second end 80 of the rebound shaft 68 situated within the cavity 50.

As shown in FIG. 2, the compression piston unit 38 includes a fork cap 86 coupled to the first end 78 of the shaft 66 opposite the coupler 82. This cap 86 includes a threaded aperture 88 therethrough that corresponds with the threads 76 on the external face 74 of the shaft 66. The fork cap 86 also includes an exterior surface 90 with threads 92 extending about the circumference of the surface 90. The threads 54 at the outer end 44 of the upper leg 30 correspond with the threads 92 formed on the exterior surface 90 of the fork cap 86. Thus, the compression piston unit 38 is securely mounted in the cavity 50 of the upper leg 30.

An end plug 94 is secured in the inner end 46 of the upper leg 30. The end plug 94 is sized for extension into the cavity 50 of the upper leg 30 and includes a side wall 96 having threads 98 thereon that correspond to the threads 54 on the interior face 52 of the upper leg 30. In addition, the end plug 94 includes an aperture 100 therethrough that is sized for slidable extension of the rebound shaft 68 therethrough. Moreover, individual tubular seals 102 are situated on the fork cap 86 and at the bottom end 58 of the lower leg 32. Each seal 102 is formed to have an aperture 104 therethrough that is sized to snugly receive the respective shafts 66, 68 therein.

The couplers 82, 84 of the respective compression and rebound piston units 38, 40 are formed similarly to one another. Each coupler 82, 84 is barbell-shaped when assembled and has opposite disc-shaped ends 106, 108 and a cylindrical hollow post 110 extending between the disc-shaped ends 106, 108. See FIGS. 3 and 4. The outer disc 106 of each of the barbell-shaped coupler 82, 84 is mounted on the second end 80 of the respective shafts 66, 68 and the opposite inner disc 108 extends into the cavity 50 of the upper leg 30. The outer and inner discs 106, 108 are shallow in width and circular in plan view. The outer disc 106 of each coupler 82, 84 has a first circle 112 engaging the second end 80 of the respective shafts 66, 68 and a second circle 114 engaging the hollow post 110. The inner discs 108 each have a third circle 116 engaging the hollow post 110 and a fourth opposite circle 118. A radially outer peripheral surface 120 extends between the first circle 112 and the second circle 114 and a radially outer sidewall 122 extends between the third circle 116 and the fourth circle 118 respectively.

As best shown in FIG. 2, the outer and inner discs 106, 108 are each formed to include a central oil flow aperture 124 extending through the first and second circles 112, 114 and the third and fourth circles 116, 118 respectively. The central oil flow apertures 124 in each disc 106, 108 are in fluid communication with one another via the hollow post 110 extending between the outer and inner discs 106, 108. In addition, the sidewall 122 of the inner discs 108 are each formed to include four spaced-apart peripheral oil flow apertures 126, each in communication with the central oil flow aperture 124. THE hollow post 110 includes dual apertures 127 extending therethrough generally perpendicular to the central oil flow aperture 124. In addition, the outer discs 106 each include two oil flow slots 128 in communication with the central oil flow aperture 124. The oil flow slots 128 are generally aligned with the dual apertures 127 and are positioned in a linear relation to one another through the fourth circle 118 and the sidewall 122 of the outer discs 106.

The hollow post 110 of the barbell-shaped couplers 82, 84 is preferably integral with the inner disc 108. The end of the hollow post 110 extending away from the inner disc 108 preferably includes threads 130 that are sized for engagement with the threads 75 on the internal face 70 of each shaft, 66, 68. A stationary compression piston 134 and a moveable rebound piston 136 are press-fit on the hollow post 110 between the discs 106, 108. The compression piston 134 and the rebound piston 136 each include a mounting aperture 138 that is sized for extension of the hollow post 110 therethrough. The hollow posts 110 each extend through the mounting aperture 138 of the respective pistons 134, 136. A spacer 132 is positioned on the post 110 to securely fasten the respective pistons 134, 136 in place. The spacer 132 on the post 110 of the coupler 82 mounts the piston 134 adjacent the outer disc 106. See FIGS. 2 and 3. The spacer 132 on the post 110 of the coupler 84 mounts the piston 136 adjacent the inner disc 108. See FIGS. 2 and 4.

The compression and rebound pistons 136, 138 have the same configuration and each have a first face 140 more proximal to the inner disc 108 and an opposite face 142 more proximal to the outer disc 110 in the assembled damper apparatus 10. A radially outer peripheral surface or sidewall 144 of each piston 136, 138 extends between the opposite faces 142. The diameter of the peripheral surface 144 is sized to fit the inner diameter of the upper leg 30. See FIG. 2. Thus, oil 42 is substantially blocked from flowing between the side wall 144 of the pistons 136, 138 and the interior face 52 of the upper leg 30 during compression or extension between the upper and lower legs 30, 32. The pistons 136, 138 are each formed to include three spaced-apart slots 146 extending through the opposing faces 140, 142. See, for example FIG. 5. In addition, three angled apertures 148 are Situated through the opposing faces 140, 142 in a spaced-apart relationship to one another between the three slots 146. The apertures 148 are defined by opposite mouths 150, 152. The apertures 148 are angled in a manner that positions the first mouth 150 through the first face 140 of the pistons 136, 138 adjacent the mounting aperture 148 and the opposite step-up mouth 152 in a position that overlaps the second face 142 and the outer periphery 144. It is understood that greater than or less than three slots 146 or apertures 148 may extend through the pistons 134, 136 so long as there is at least one slot or aperture therethrough.

Figure 3:
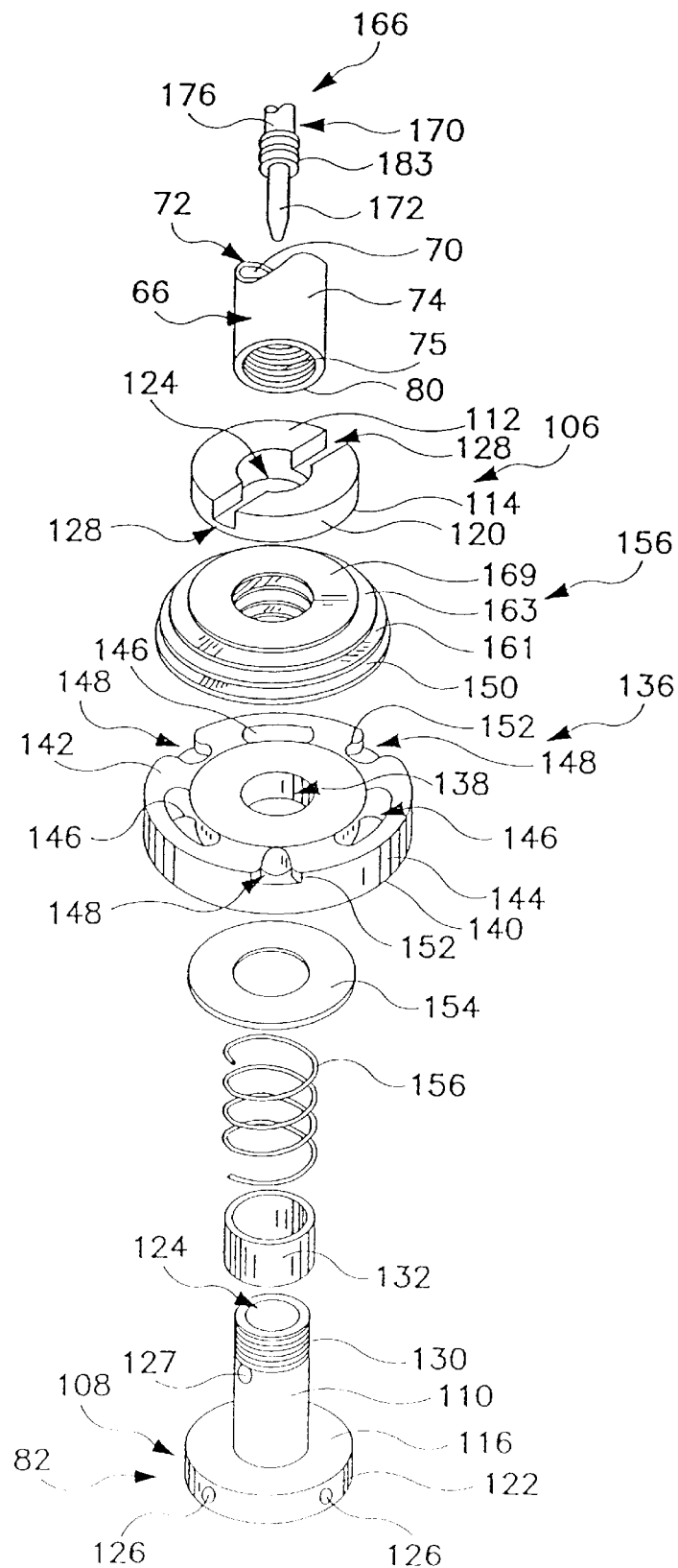
FIG. 3 is an exploded perspective view of a portion of the compression piston unit showing a coupler, a shim stack, a compression piston, a movable valve, a shaft, and a needle formed to extended into the coupler.

As best shown in FIG. 3 the compression piston 134 is formed to be mounted on the hollow post 110 of the coupler 82 adjacent the outer disc 106. A movable valve 154 is positioned on the hollow post 110 between the face 142 of the piston 134 and the inner disc 108. A spring 156 normally biases the valve 154 against the first face 140 of the piston 134. The movable valve 154 preferably has a diameter substantially equivalent to the diameter of the inner disc 108. Thus, the diameter of the movable valve 154 is sufficient only to cover the mouths 150 of the three apertures 148. A shim 158 is positioned on the hollow post 110 between the second face 142 of the piston 134 and the outer disc 106 of the coupler 82. The shim 158 has a diameter that is slightly less than the diameter of the piston 134. Thus, the shim 158 substantially covers the spaced-apart slots 146, but leaves the step-up mouths 152 of the apertures 148 open. Preferably the apparatus 10 includes a shim stack 159 between the piston 134 and disc 106. The stack 159 includes shims 158, 161, 163, 169 that decrease in size as they are stacked from the piston 134 to the outer disc 106. It is understood that the number, order, and size of shims in the stack 159 may be varied to accommodate riders of different weight and to alter the compression damping of the apparatus 10.

The shim 158 is not movable and although the moveable valve 154 does not cover the three slots 146, the shim 158 permanently blocks three spaced-apart slots 146 extending through the piston 134 from oil flow therethrough. Importantly, the mouth 152 of the three apertures 148 remains open through the second face 142. The three apertures 148 are opened through the first face 140, of the piston 134, however, only when the fluid flow pressure is such that the valve 154 is moved against the spring 156 toward disc 108.

Referring now to FIG. 4, the rebound piston 136 is mounted on the hollow post 110 of the coupler 84 adjacent the outer disc 106. A movable valve 160 is positioned on the hollow post 110 between the outer disc 106 and the piston 136 and is normally biased against the second face 142 of the piston 136 by a spring 162. This movable valve 160 has a diameter that is slightly less than the diameter of the piston 136. Thus, the moveable valve 160 selectively covers the three spaced-apart slots 146. A shim 164 is positioned on the hollow post 110 between the first face 140 of the piston 136 and the inner disc 108 of the coupler 84. The shim 164 has a diameter that is substantially equivalent to the diameter of the inner disc 108. Thus, the shim 164 only covers the mouths 150 of the three apertures 148. The shim 164 is pressed against the piston 136 and therefore covers the mouths 150 of the three angled apertures 148. In preferred embodiments, a shim stack 165 is situated between the piston 136 and the disc 108. The shim stack 165 includes shim 164 and shim 167. Shim 167 has a diameter that is less than shim 164. It is understood that the number, order, and size of shims in stack 165 may be changed to manipulate the stiffness of the rebound.

The damping apparatus 10 of the present invention further includes a compression adjustment mechanism 166 and a rebound adjustment mechanism 168. The mechanisms 166, 168 each cooperate with the respective couplers 82, 84. Each of the adjustment mechanisms 166, 168 include a needle 170 having a pointed end 172, an opposite end 174, a cylindrical side wall 176 extending between the ends 172, 174, and a knob 178 coupled to the opposite end 174 of the needle 170. Illustratively, the pointed end 172 of the needle 170 is positioned adjacent the respective coupler 82, 84 and the knob 178 is coupled to the opposite end 174 of the needle 170 by a screw 180. It is understood, however that pins, rivets, staples, adhesives, and other well known attachment means may be used to coupled the knob 178 to the needle 170. Illustratively, spaced-apart seals 183 are situated on the side wall 176 threads 181 extend about the cylindrical side wall 176 of the needle 170.

The passage 72 in each of the shafts 66, 68 of the compression and the rebound units 38, 40 is sized to receive the needle 170 therein. The passage 72 is formed to include a first section 182 having a first diameter sized to receive the side wall 176 of the needle 170 therein and a second section 188 extending from the first section 182. In preferred embodiments, grease or oil is provided in the passage 72 to provide lubrication for manipulating the needle 170 in the first section 182 of the passage 72. The third section 188 is formed to have a diameter that is greater in size than the diameter of the first section 182. The third section 188 is sized to receive the knob 178 therein and includes threads 190 about its periphery that are formed to correspond with the threads 181 on the needle 170.

The compression piston unit 38 allows a user to adjust the stiffness of the bicycle fork 12. This adjustment is achieved by turning the knob 178 of the compression adjustment mechanism 166. The knob 178 selectively drives the needle 170 up or down in the passage 72 to adjust the positing of the pointed end 172 of the needle 170 in the hollow post 110 of the coupler 82. This relative positioning alters the flow diameter of the oil flow aperture 124 and thus the ability of the oil 42 to flow through the piston 134.

Adjustment of the knob 178 reduces the flow of fluid through the compression piston 134 for small bumps and thus stiffens the compression response of the bicycle fork 12. The oil flow aperture 148 remains open, however, so with large bumps, the upward pressure of the lower leg 32 as shown by arrow 192 forces the flow through the apertures 127 and past the compression piston 134 as shown by arrows 202. See FIG. 6. Thus, the upper leg 30 moves into the outer leg 32 and thus absorbs the shock of the large bump.

The rebound piston 136 beneficially allows the user to individually adjust the speed/stiffness of the rebound of the bicycle fork 12. This adjustment is achieved by turning the knob 178 of the rebound adjustment mechanism 166. Turning the rebound assembly knob 178 drives the needle 170 up or down in the passage 72 to adjust the positioning of the pointed end 172 of the needle 170 in the hollow post 110 of coupler 84. The extent to which the needle 170 is positioned in the post 110 alters the flow diameter of the aperture 124 and thus the rate of fluid flow through the coupler 84. Therefore, as the needle 170 is adjusted to reduce the diameter of the aperture 124, fluid slowed as it passes into the two oil flow slots 128 in the outer disc 106 of the coupler 84 thus slowing the rebound of the fork 12.

The relative positioninig of the compression coupler 82 and the rebound coupler 84 within the cavity 50 of the upper leg 30 in the assembled damping apparatus 10 creates three flow zones within the cavity 50. The first normal zone 194 is situated in the cavity 50 between the inner disc 108 of the compression coupler 82 and the inner disc 108 of the rebound coupler 84. The second compression zone 196 is situated between the second face 142 of the piston 134 and the fork cap 86 mounted in the outer end 44 of the upper leg 30. The third rebound zone 198 is situated between the second face 142 of the rebound piston 136 and the inner end 46 of the upper leg 30. It is understood that the volumetric size of the second compression zone 196 is constant, but the volumetric size of the first normal zone 198 and the third rebound zone 198 vary depending upon the relative positioninig of the upper leg 30 within the chamber 62 of the lower leg 32.

In operation, when the bicycle fork 12 encounters a bump force, the lower leg 32 is forced upwardly as shown by arrow 192. This upwardly movement forces the upper leg 30 into the chamber 62 of the lower leg 32, causing the rebound piston 136 to move toward the stationary compression piston 134 within the cavity 50 of the upper leg 30. Movement of the rebound piston 136 toward the compression piston 134 reduces the volumetric size of the first normal zone 194, forcing the oil bath 42 to displace to make room for the rebound shaft 68. The oil 42 is displaced through the peripheral and central oil flow apertures 126, 124 in the inner disc 108 and out from the aperture 127 into the second compression zone 196, creating compression damping as shown by arrows 202.

The rebound piston 136 does not substantially effect this compression damping. On a compression stroke of the fork leg 18, as shown by arrow 192, the rebound piston 136 and the movable valve 160 cooperate to act as a blow-off valve to eliminate a vacuum effect within the cavity 50. The piston 136 and valve 160 serve to minimize the effect of the rebound piston 136 on the compression damping. As shown in FIG. 6, oil flow into the spaced-apart slots 146 in the first face 140 of the rebound piston 136 forces the movable valve 160 to move against spring 162 away from the second face 142 of the piston 136. Oil is free to flow, as shown by arrow 200 into the third rebound zone 198 as the upper leg 30 moves into the chamber 62 of the lower leg 32.

When compression force is relieved, a compression spring (not shown) in the opposite fork leg 19 presses on the lower leg 32 away from the crown 16. This movement is transferred to the first fork leg 18 through the dropouts 34 that are commonly mounted on a bicycle wheel (not shown). The speed at which the compression spring (not shown) is able to press the lower leg 32 away from the crown 16 is adjusted by the rebound adjustment mechanism 168 in the lower leg 32 of fork leg 18.

Rebound damping is achieved by oil transferring from one side of the rebound piston unit 40 to the other. See arrows 205. The movable valve 160 is pressed against the second face 142 of the piston 136 during the expansion stroke. See FIG. 7. During expansion an stroke the compression piston 134 and the movable valve 154 cooperate to act as a blow-off valve and permit rapid fluid flow through the spaced-apart apertures 148 in the piston 134. Oil flow into the apertures 148 in the second face 142 of the compression piston 134 forces the movable valve to move against spring 156 away from the first face 140 of the piston 134. Oil is free to flow as shown by arrow 203 back in to the first flow zone 194 as the upper leg 30 moves out of the chamber 62 of the lower leg 32.

Figure 8:
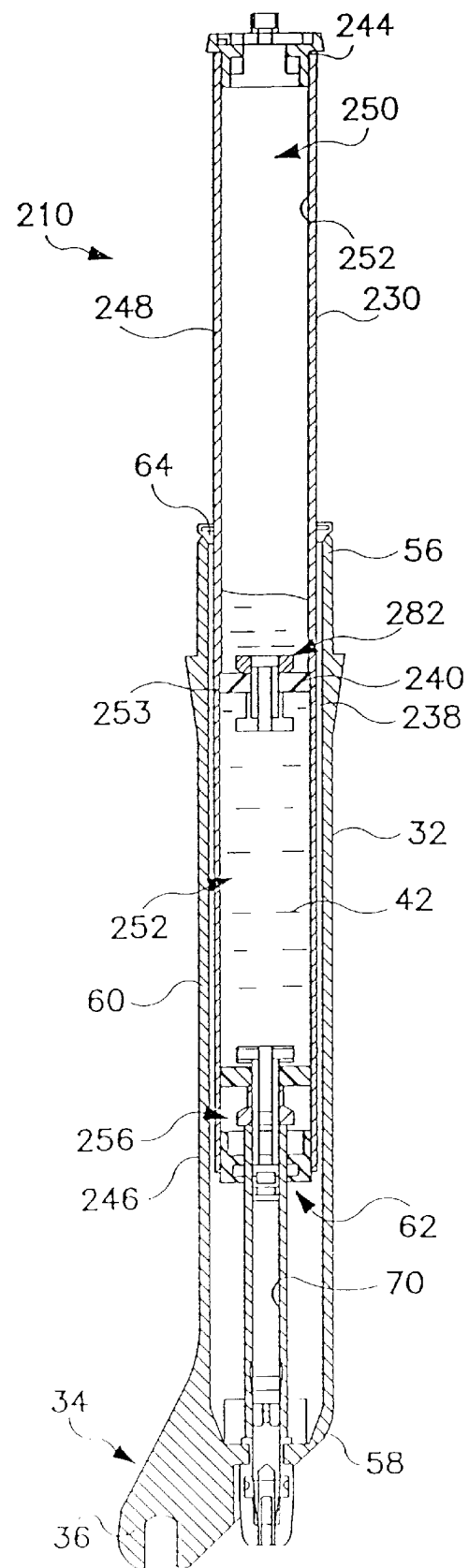
FIG. 8 is a cross-sectional view of an alternative embodiment of the damping apparatus of the present invention showing a compression piston unit and an adjustable rebound piston unit.

In an alternative embodiment of the present invention, a damping apparatus 210 is provided that includes an upper leg 230 that is formed for slidable extension into the lower leg 32. See FIG. 8. The upper leg 230 includes opposite ends 244, 246, a center portion 248 that is formed to include an interior face 252 that defines a cavity 250 and that forms a valve seat 253 thereon. The damping apparatus 210 also includes a compression piston unit 238 situated within the cavity 250 of the upper leg 230 and the adjustable rebound piston unit 40 illustrated in FIG. 2. The unit 40 is coupled to the lower leg 32 and formed to extend into the cavity 250 of the upper leg 230.

The cavity 250 of the upper leg 230 is formed in three zones 252, 254, 256 that correspond generally with the normal first flow zone 194, the second compression zone 196, and the third rebound zone 198 respectively of the apparatus 10. The compression piston unit 238 is semi-press fit against the valve seat 253 in the first zone 252 and the rebound piston unit 40. The compression unit 238 includes a compression coupler 282 having a compression piston 240 and shim stack (not shown) mounted thereon. The compression coupler 282 is formed in the same manner as coupler 82, except that coupler 82 has threads 130 for secure engagement with the shaft 66.

In operation, upon experiencing the force of a bump, the lower leg 32 moves over the center portion 244 of the upper leg 230. This movement forces the rebound shaft 68 into the cavity 250 toward the valve seat 253 and the oil 42 to flow through the compression piston unit 238 as previously described into the compression zone 254. Since the apparatus 210 lacks a compression adjustment mechanism, the amount of compression damping cannot be adjusted by the bicycle rider. The apparatus 210 does, however, include the rebound adjustment mechanism 168. Thus, the oil freely flows through the slots 146 formed in the rebound piston 136 as previously described into the third zone 256 during compression of the apparatus 210. During expansion movement, however, the oil 42 must flow substantially through the central oil flow aperture 124 of the coupler 84. The speed of this flow is altered by driving the needle into and out of the passage 72 of the shaft 68.

Figure 9:
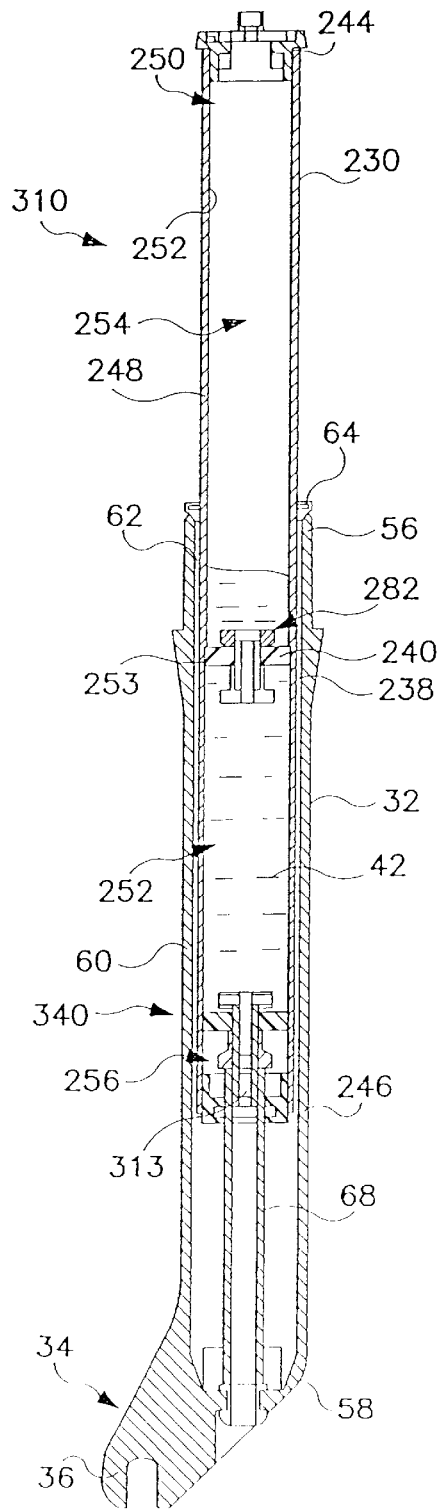
FIG. 9 is another cross-sectional view of an alternative embodiment of the damping apparatus of the present invention showing a compression piston unit and a rebound piston unit.

In yet another alternative embodiment of the present invention, a damping apparatus 310 is provided that includes the upper leg 230 that is formed for slidable extension into the lower leg 32. See FIG. 9. The upper leg 230 is formed as previously described and the compression piston unit 238 is semi-press fit against seat 253 within the first zone 252 of the cavity 250. The damping apparatus 310 also includes a rebound piston unit 340 coupled to the lower leg 32 and formed to extend into the cavity 250 of the upper leg 230.

The rebound piston unit 340 includes the coupler 40, the rebound shaft 68, and the rebound piston 136 as previously described. In preferred embodiments, the shaft 68 is solid. It is understood however that the central oil passage 124 through the outer disc 108 could also be sealed to prevent oil therethrough. Since the apparatus 310 lacks a compression adjustment mechanism and a rebound adjustment mechanism, the bicycle rider will not have the ability to adjust the amount of compression damping or rebound damping without dissembling the apparatus or changing the weight of the oil.

Ideally, the damping system of the present invention is designed with the compression spring (not shown) in one leg of the fork 19 and the damping apparatus 10 in the other leg 18, but a fork 12 can be designed to work with springs on both legs 18, 19 by mounting an external spring (not shown), similar to a rear shock, or by mounting the springs underneath the inner leg 30, inside the chamber 62 outer leg 32.

Figure 10:
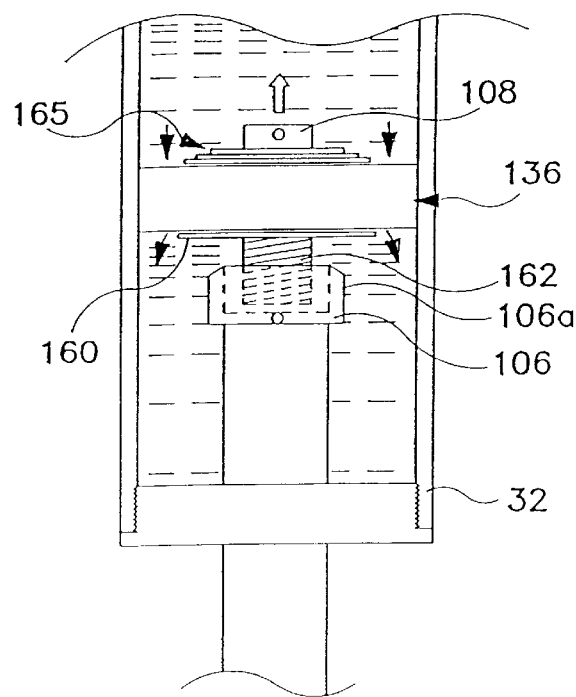
FIGS. 10 and 11 are diagrammatic illustrations of another embodiment of the damping apparatus of the present invention showing the action of the rebound piston blow-off valve on low velocity and high velocity compression strokes.
Figure 11:
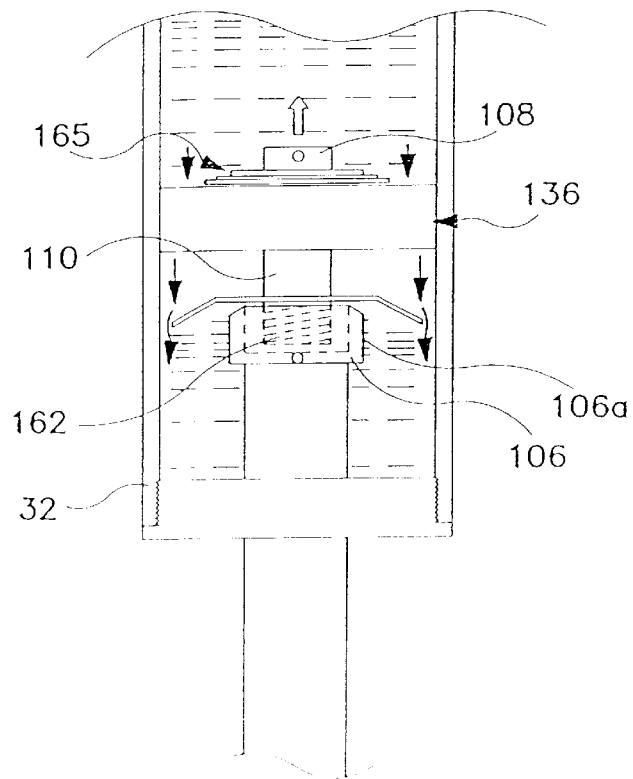

FIGS. 10 and 11 illustrate the operation of the rebound piston unit when a flexible valve 160 is utilized. As shown in FIG. 10, when a compression force, indicated by arrow 192, causes a relatively low velocity movement of lower leg 32 on a compression stroke, damping fluid will pass through slots 146 and push valve 160 against spring, 162. For these low velocity movements, valve 160 will not fully compress spring 162, as moving valve 160 part way along post 110 of coupler 84 provides sufficient blow-off on the compression stroke.

On high velocity movements of lower leg 32 on the compression stroke, damping fluid will flow through slots 146 as shown and press valve 160 against extended walls 106a, which have been added to disc 106. As the pressure of the damping fluid against valve 160 increases, valve 160 will flex as shown, thereby providing smoother compression damping.

Figure 12:
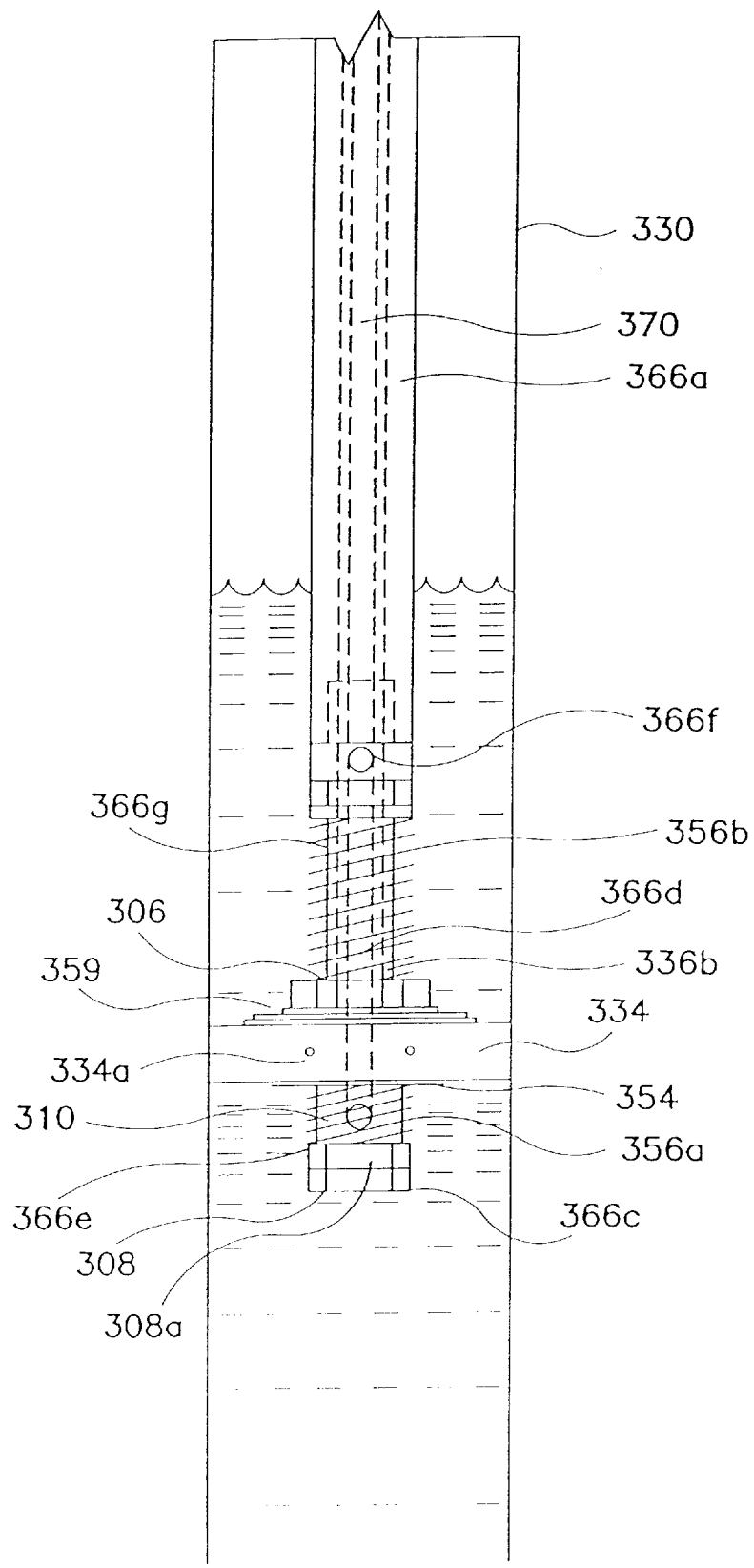
FIG. 12 illustrates another embodiment of a compression piston unit for a damping apparatus according to the present invention.
Figure 13:
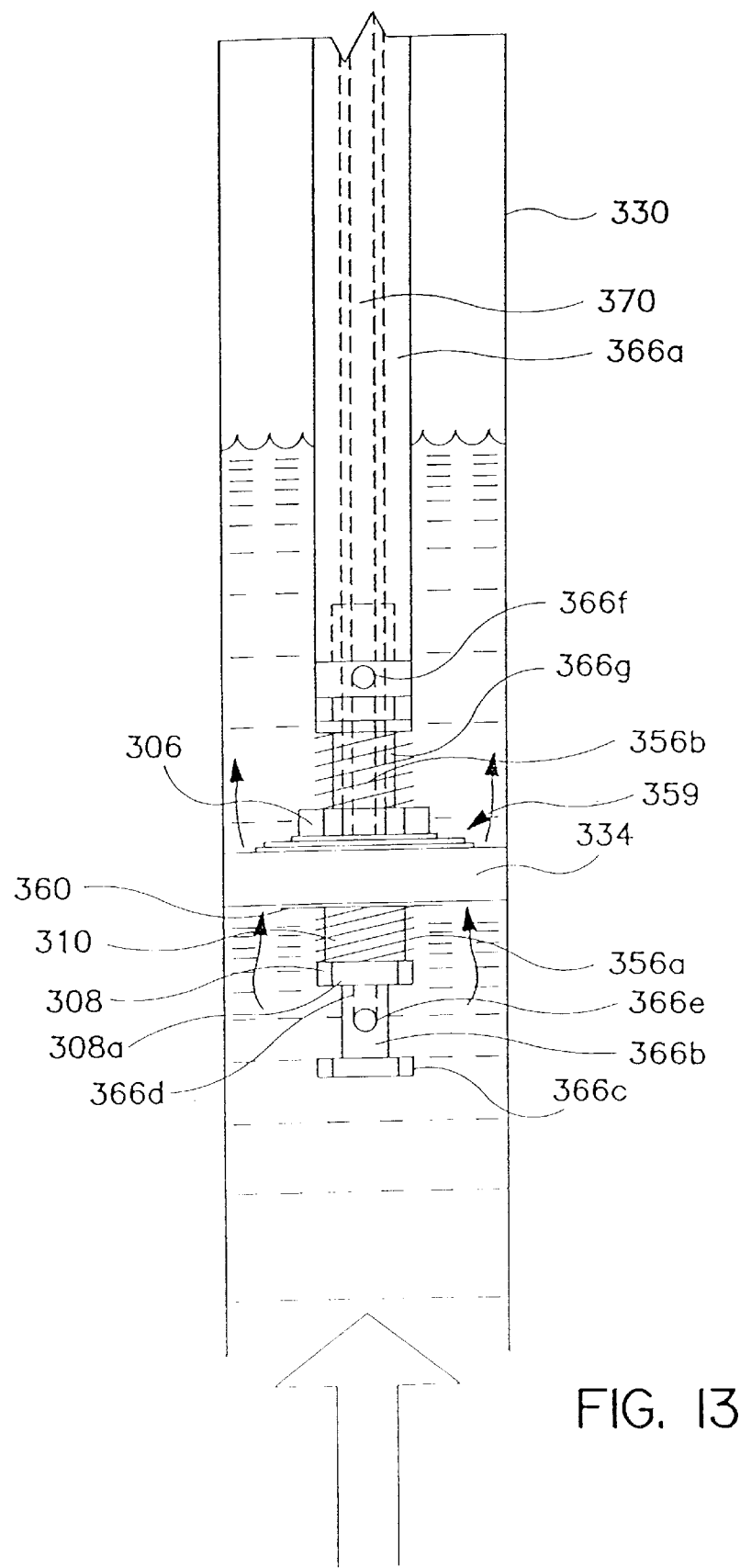
FIG. 13 illustrates the compression piston unit of FIG. 12 when a compression force is applied to the damping, apparatus.

FIGS. 12 and 13 show another embodiment of a compression piston unit. In this embodiment, a shaft 366b is disposed within shaft 366a. Shaft 366b terminates in a first stop 366c. A passage 366d extends along the interior of shaft 366b and includes a lower aperture 366e and an upper aperture 366f. The longitudinal axis of passage 366d is generally parallel to and generally coincident with the longitudinal axis of shaft 366a and 366b. Apertures 366e and 366f are generally transverse to the longitudinal axis of passage 366d. Needle 370 extends down through shaft 366b and is adjustable with respect to aperture 366f in a manner similar to that described above for needle 170 in the embodiment of FIG. 2. A second stop 366g is attached to the lower end of shaft 366a. Stop 366g can be secured to shaft 366a in any number of ways, including threading it into shaft 366a. A spring 356b is disposed about stop 366g. Piston 334 includes slots 346 (not shown) and apertures 348 (also not shown) corresponding to slots 146 and apertures 148 in the embodiment of FIG. 3. A central bore is provided through lock nut 306, disk 308, post 310, piston 334, valve 354 and the various shims in shim stack 359 to accommodate shaft 366b. Note that disk 308 includes a tapered inner area 308a. Disk 308 may be provided with oil flow apertures corresponding to apertures 126 of the embodiment of FIG. 3. An o-ring or similar seal 334a is provided in piston 334 and rides along shaft 366b, as described below.

In its initial, uncompressed state, piston 334 is at the lower end of shaft 366b such that disk 308 rests on stop 366c. As a compression force, as indicated by arrow 192, is applied to the lower leg (not shown), the lower leg and its rebound shaft will enter upper leg 330 thereby displacing damping fluid upwardly. As this occurs, piston 334 and the other components joined by coupler 382 begin to rise along shaft 366b. As this occurs, the tapered area 308a within disk 308 slowly exposes aperture 366e, thereby allowing damping fluid to flow within passage 366d and through aperture 366f. Note that as piston 334 rises, valve 354 remains against piston 334 and seals off apertures 348 (not shown). Likewise, the members of shim stack 359 remain disposed over slots 346. As the damping fluid continues to rise, piston 334 will eventually raise to the point where lock nut 306 abuts stop 366g. At this point, an increase in the damping fluid pressure will cause damping fluid to flow through slots 346 and past the shims in stack 359, as shown. Note that damping fluid also continues to flow in aperture 366e, through passage 366d and out aperture 366f. The compression damping can be controlled in various ways, as by adjusting needle 370. Similarly, compression damping can be adjusted by shortening or lengthening stop 366g such that lock nut 306 engages it earlier or later in the compression stroke. Alternatively. shafts 366b of various lengths can be utilized, thereby again effectively controlling when in the compression stroke lock nut 306 will engage stop 366g.

Figure 14:
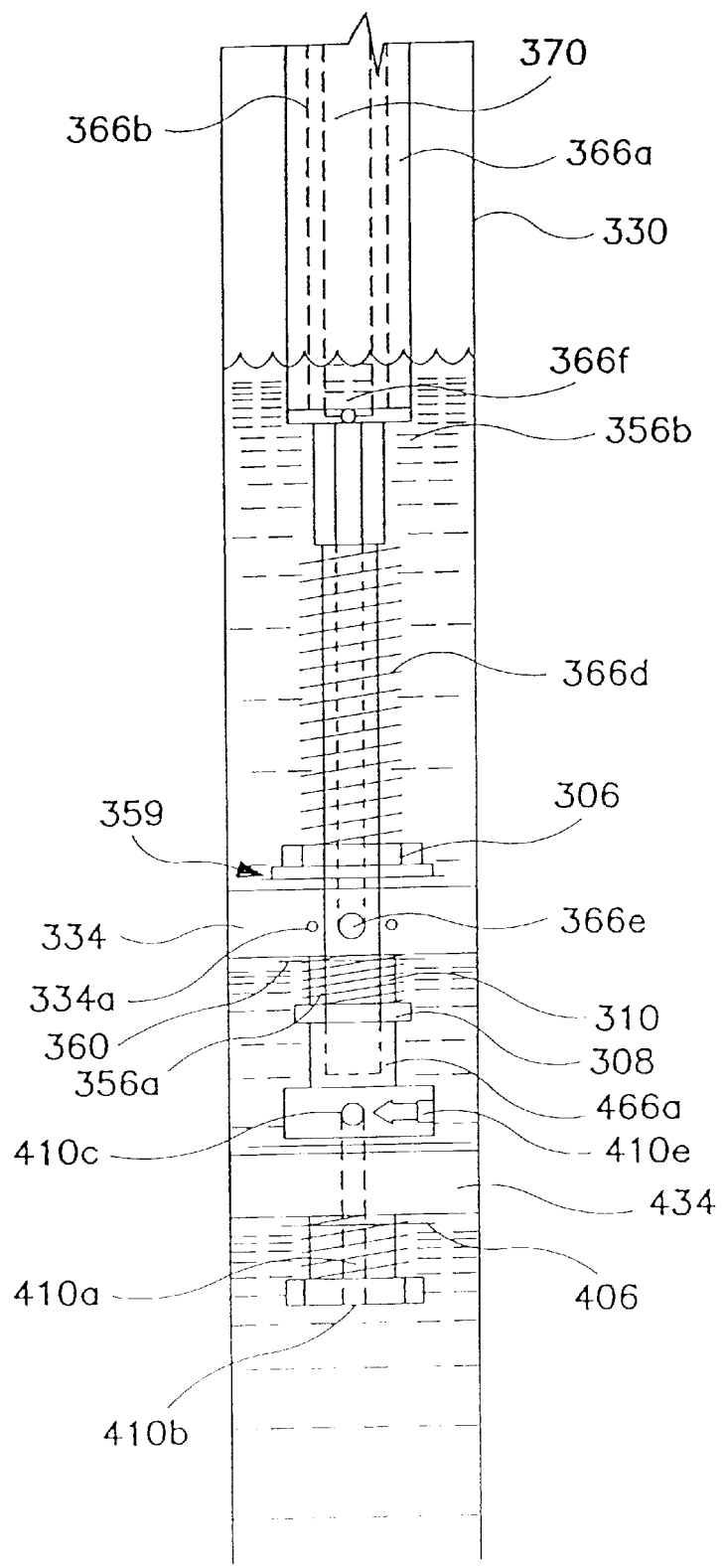
FIG. 14 is another alternative embodiment of a compression piston unit for a damping apparatus according to the present invention.
Figure 15:
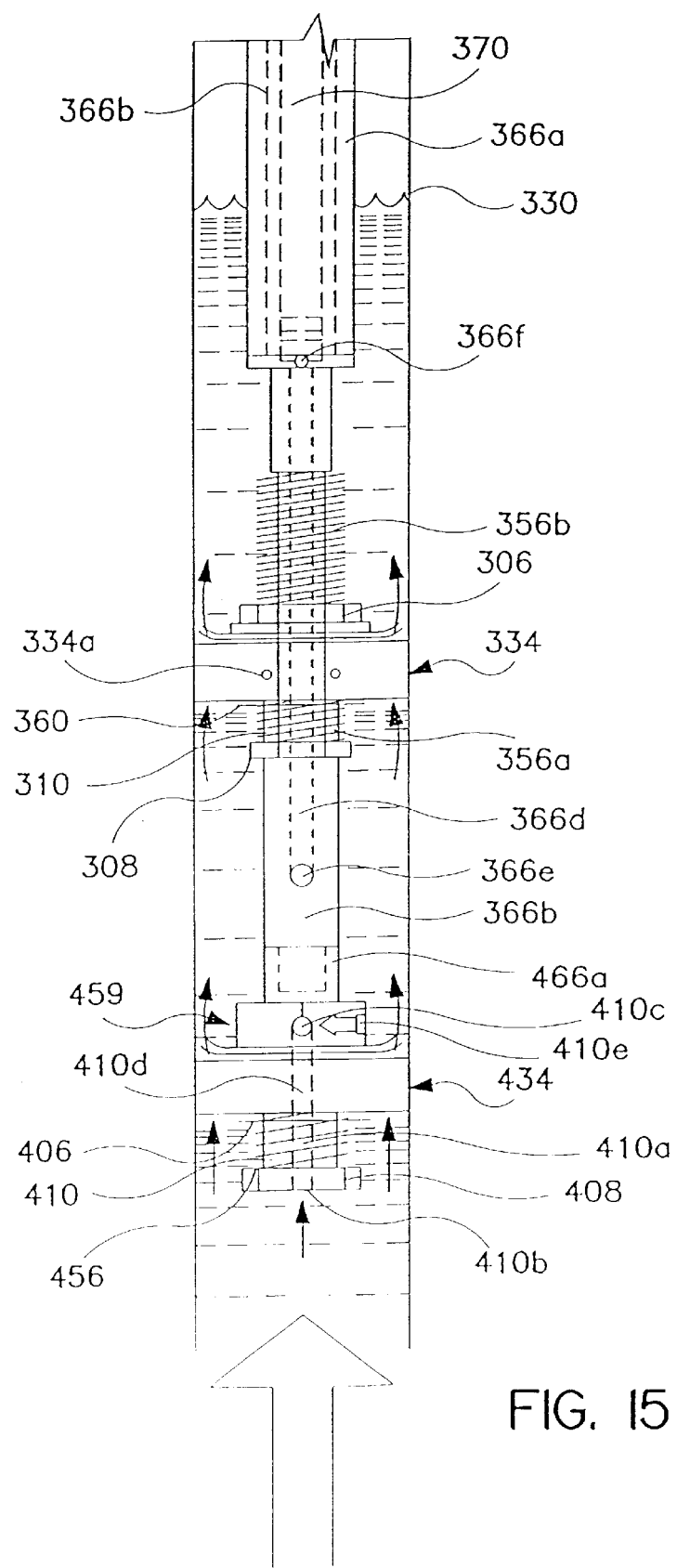
FIG. 15 illustrates the embodiment of FIG. 14 when a compression force is applied to the damping apparatus.

FIGS. 14 and 15 show yet another embodiment of the present invention. This embodiment differs from that of FIGS. 12 and 13 in that a stop 466a is attached to the lower end of shaft 366a and supports a stationary compression piston 434 and its associated components. A passage 410a extends through disk 408, post 410 and disk 406. Passage 410a has an aperture 410b at one end thereof and an aperture 410c at the other end. Disk 408 may be provided with openings corresponding to oil flow apertures 126 in the embodiment of FIG. 3. Piston 434 includes slots 446 (not shown) and apertures 448 (not shown). A needle or set screw 410e is provided in disk 406 transverse to the axis of passage 410a. Needle or set screw 410e may be used to adjust the amount of bleed through aperture 410c in a manner similar to the use of needle 370.

Figure 16:
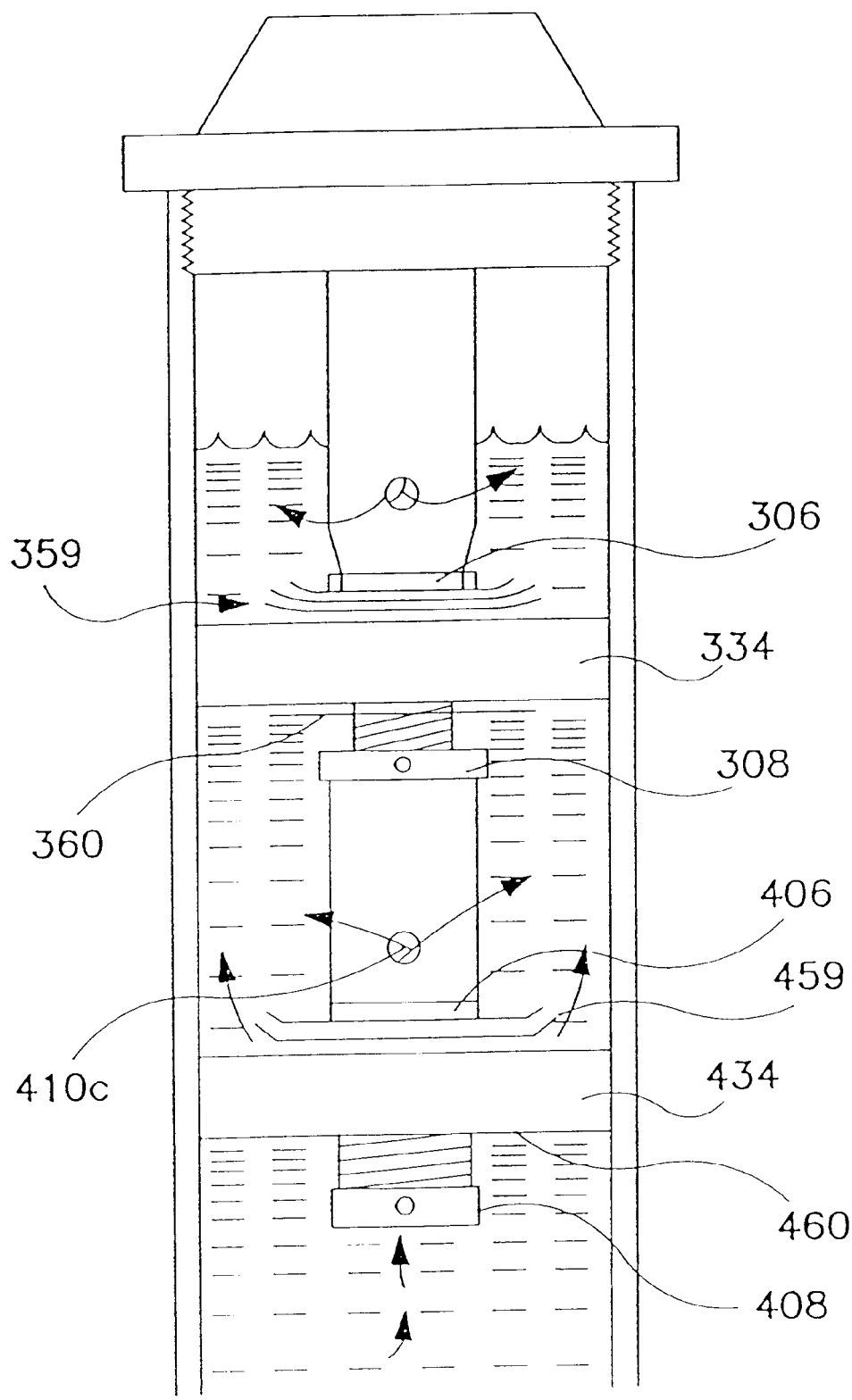
FIG. 16 is a diagrammatic illustration of another embodiment of a damping apparatus according to the present invention.

In this embodiment, as a compression force, indicated by arrow 192, is applied, the damping fluid will rise within leg 330 and flow from aperture 410b through passage 410a and out aperture 410c. Likewise, damping fluid will flow past the shims in stack 459. As fluid flows to the same side of piston 434 as piston 334, piston 334 will rise along shaft 366*a* in the manner described with respect to the embodiments of FIGS. 12 and 13. As this occurs, aperture 366*e* will be exposed and damping fluid will flow from that aperture through passage 366*d* and out aperture 366*f*. When piston 334 has reached its maximum range of travel (FIG. 15), oil will flow through piston 334 and past the shims in stack 359, as described above. Again, by adjusting the length of shaft 366*a* and the lengths of stops 366*g* and 466*a*, the point in the compression stroke at which the various pistons, passageways and apertures come into play call be controlled. Note that the embodiment of FIGS. 14 and 15 could also be modified such that both compression piston assemblies 334 and 434 are stationary. This is schematically shown in FIG. 16.

Although the apparatus has been described with reference to particular means, materials and embodiments, from the foregoing description, one skilled in the art can easily ascertain the essential characteristics of the illustrative apparatus and various changes and modifications may be made to adapt the various uses and characteristics without departing from the spirit and scope of the present invention as described by the claims which follow.

What is claimed is:

1. A bicycle fork having a damping apparatus, the damping apparatus comprising:

a cylinder defining a chamber;

a shaft disposed in the chamber;

a piston disposed in the chamber and coupled with the shaft and being movable relative to the shaft between first and second positions, the piston having a fluid flow aperture disposed there through and a valve structure associated with the piston, the valve structure being movable between engaged and disengaged positions, the fluid flow aperture being occluded when the valve structure is engaged and the fluid flow aperture being exposed when the valve structure is disengaged;

wherein the piston is a floating piston;

damping fluid located in the chamber;

the piston being movable from the first position to the second position as a result of an external force being applied to the fluid which acts on the piston; and when the piston is in the second position, the fluid is caused to move through the fluid flow aperture and move the valve structure to the disengaged position.

2. The damping apparatus of claim 1, wherein the shaft further comprises first and second apertures in communication with each other, and each aperture positioned on opposed sides of the piston.

3. The damping apparatus of claim 2, wherein the first aperture is occluded when the piston is in the first positioned and exposed when the piston is in the second position.

4. The damping apparatus of claim 1, further comprising a bias member associated with the piston.

5. A bicycle fork having a damping apparatus, the damping apparatus comprising:

a cylinder;

a damping fluid located in the cylinder;

a floating piston disposed in the cylinder and positioned adjacent the fluid;

a second piston located within the chamber; and a second shaft located in the cylinder and associated with the second piston.

6. The damping apparatus of claim 5, further comprising a bias member associated with the floating piston.

7. The damping apparatus of claim 6, wherein a shaft is disposed within the cylinder and associated with the piston.

* * * * *